United States Patent
Jin et al.

(10) Patent No.: US 12,529,711 B2
(45) Date of Patent: Jan. 20, 2026

(54) PROBE MODULE FOR TESTING OF ELECTRICAL RESISTIVITY OF CONDUCTIVE FIBER MATERIALS

(71) Applicant: NATIONAL INSTITUTE OF METROLOGY, CHINA, Beijing (CN)

(72) Inventors: Senlin Jin, Beijing (CN); Lingling Ren, Beijing (CN); Junwei Cao, Beijing (CN); Guodong Wu, Beijing (CN); Jianyun He, Beijing (CN)

(73) Assignee: NATIONAL INSTITUTE OF METROLOGY, CHINA, Beijing (CN)

( * ) Notice: Subject to any disclaimer, the term of this patent is extended or adjusted under 35 U.S.C. 154(b) by 147 days.

(21) Appl. No.: 18/632,843

(22) Filed: Apr. 11, 2024

(65) Prior Publication Data
US 2024/0345131 A1    Oct. 17, 2024

(30) Foreign Application Priority Data
Apr. 12, 2023 (CN) .......................... 202310397262.5

(51) Int. Cl.
*G01R 1/067* (2006.01)
*G01R 1/073* (2006.01)

(52) U.S. Cl.
CPC ..... *G01R 1/06722* (2013.01); *G01R 1/07314* (2013.01)

(58) Field of Classification Search
CPC  G01R 1/06722; G01R 1/07314; G01R 27/02; G01N 27/041
USPC ..................................................... 324/755.05
See application file for complete search history.

(56) References Cited

U.S. PATENT DOCUMENTS 6,288,555 B1 * 9/2001 Harris ..................... G01R 35/00
                                              324/755.02
6,958,616 B1 * 10/2005 Mahoney ........... H01R 13/2421
                                              324/755.05

FOREIGN PATENT DOCUMENTS

| CN | 112020654 A | * | 12/2020 | ............... G01R 1/18 |
| CN | 113267680 A | * | 8/2021 | ............. G01R 27/02 |
| CN | 114737952 A | * | 7/2022 | ............. E21B 49/08 |
| CN | 115575679 A | * | 1/2023 | ......... G01R 1/06722 |
| CN | 219630031 U | * | 9/2023 | |
| JP | 2000048658 A | * | 2/2000 | |
| JP | 2002055131 A | * | 2/2002 | |
| JP | 2006098376 A | * | 4/2006 | ......... G01R 1/07314 |
| JP | 2022179066 A | * | 12/2022 | ......... G01R 27/2641 |
| KR | 20240000389 A | * | 1/2024 | ......... G01R 1/06733 |
| TW | I388846 B | * | 3/2013 | ......... G01R 31/2805 |

(Continued)

*Primary Examiner* — Christopher P McAndrew
(74) *Attorney, Agent, or Firm* — HAUPTMAN HAM, LLP

(57) ABSTRACT

A probe module for testing the resistivity of a conductive fiber material includes four gland spring holes in the upper end gland are uniformly formed in the bottom surface of the gland main body; one end of a pressure spring is abutted against the top of the gland spring holes, and the other end of the pressure spring contacts a conductive sheet; an outer wall of a probe frame is of an external thread structure which is matched with an internal thread structure of an internal threaded hole and threadably secured thereto; the probe frame is internally provided with a spring probe; a pressure sensor contacts the conductive sheet, and both are sleeved on an upper part of the spring probe; and the top end of the spring probe is in contact with the pressure spring, and the bottom end of the spring probe contacts a conductive fiber material sample.

6 Claims, 4 Drawing Sheets

(56) References Cited

FOREIGN PATENT DOCUMENTS

| TW | I645194 B | * | 12/2018 | ......... G01R 1/06716 |
| WO | WO-2011129244 A1 | * | 10/2011 | ............. H01L 22/00 |
| WO | WO-2020111076 A1 | * | 6/2020 | ......... G01R 1/06772 |
| WO | WO-2021193304 A1 | * | 9/2021 | ......... G01R 31/2863 |
| WO | WO-2024213362 A1 | * | 10/2024 | ............. G01K 1/143 |

* cited by examiner

PROBE MODULE FOR TESTING OF ELECTRICAL RESISTIVITY OF CONDUCTIVE FIBER MATERIALS

CROSS REFERENCE TO RELATED APPLICATIONS

The present application claims priority from Chinese Application Number 202310397262.5 filed Apr. 12, 2023, the disclosure of which is hereby incorporated by reference herein in its entirety.

TECHNICAL FIELD

The present invention relates to the technical field of conductive fiber material testing apparatuses, in particular to a probe module for testing the resistivity of a conductive fiber material.

BACKGROUND ART

In the preparation and production process of a conductive fiber material, due to different production processes and preparation purposes, the fiber material will be coated with a semiconductor film layer or a graphene layer. For a conductive material such as the conductive fiber material (for example, a graphene glass fiber), resistivity may be used as a comprehensive performance index for evaluating the material. A collinear four-probe array is a common tool for measuring the resistivity of a semiconductor material, and can test the resistivity rapidly and conveniently. A probe module of the collinear four-probe array is the key part to be in contact with the material, which is a prerequisite for an instrument to perform an accurate measurement. A research shows that four contact resistances of the four-probe array and a pressure of a single probe greatly affect the testing result. Although the existing collinear four-probe module has a certain pressure spring to ensure a contact with a sample, it is difficult to ensure that the pressure of the four probes is the same for a conductive fiber material, so as to achieve stable and effective measurement.

In the measurement of resistivity of a conductive fiber material by a conventional four-probe array, it is difficult to make all the four probes in the same connection state due to the four-probe module group in the conventional collinear four-probe array, the reason for which is inability of individually setting the pressures of the four probes, diameters of probe tips, etc. Also for a thin plate material with high roughness, when the resistivity is tested by the collinear four-probe array, due to a small pressure adjustment range of the four probes in general, the stretching range of the probes is small, and there is a material applicable range problem caused by an effect of different diameters of the probe tips on the test result of the material with high roughness. Moreover, there is no ohmic contact verification process in the test by the existing collinear four-probe array. The ohmic contact is necessary for verifying whether a metal probe is successfully connected with a semiconductor film material. In view of this, the test result of the existing four-probe device will be unreliable and unstable. The ohmic contact: in testing the semiconductor material, a good contact between the metal and the semiconductor material is a prerequisite for ensuring a successful test, wherein the good contact refers to an ohmic contact with linear I-V characteristics, rather than a Schottky contact with a rectification effect.

In addition, the research shows that for the resistivity tests of different materials, parameters of the probes (such as the probe diameter and other probe parameters) should be adjusted correspondingly so as to meet the test requirements. However, the existing collinear four-probe array cannot provide probes with different lengths or different tip diameters or other parameters to accommodate the test of samples made of different materials and different specifications.

Therefore, it is necessary to provide a probe module for testing the resistivity of a conductive fiber material, wherein the probe specification can be adjusted, and the probe pressure can be fed back in real time to eliminate the occurrence of different ohmic contact resistances caused by different pressures, and besides, an ohmic contact test is introduced before initiating the test of resistivity to ensure good ohmic contact as the premise of the test.

SUMMARY OF THE INVENTION

In view of the above, the present invention aims to provide a probe module for testing the resistivity of a conductive fiber material, which can display the pressure of each spring probe in real time, adjust the pressure of each spring probe within a large range, and make the pressure of each spring probe be consistent with each other. Moreover, an ohmic contact test is introduced before initiating the test of resistivity, so as to ensure good ohmic contact between each spring probe and a sample, thereby ensuring the accuracy of the test.

To solve the above technical problems, the present invention adopts the following technical solutions:

A probe module for testing the resistivity of a conductive fiber material includes an upper end gland, a probe frame module, and a spring probe. The upper end gland is in compressed connection with the probe frame module through a bolt; the upper end gland includes a gland main body, four gland spring holes, a conductive sheet, and a pressure spring; the four gland spring holes are uniformly formed in the bottom surface of the gland main body; one end of the pressure spring is abutted against the top of the gland spring holes, and the other end of the pressure spring is in contact with the conductive sheet; the probe frame module includes a probe frame main body, a pressure sensor, four internal threaded holes, and a single probe frame; the four internal threaded holes are uniformly formed in the top surface of the probe frame main body; an inner wall of each of the internal threaded holes is of an internal thread structure; an outer wall of the single probe frame is of an external thread structure which is matched with the internal thread structure and threadably secured thereto; the single probe frame is internally provided with a spring probe; the pressure sensor is in contact with the conductive sheet, and both of them are sleeved on an upper part of the spring probe; and the top end of the spring probe is in contact with the pressure spring, and the bottom end of the spring probe is in contact with a conductive fiber material sample to be tested. A method for testing the resistivity by a collinear four-probe array comprises, making four conductive probes in the collinear four-probe array in a good contact with the sample, and then measuring the resistivity by applying a current and a probing voltage to two of the conductive probes. Therefore, four spring probes are placed in the probe frame module, and the upper end gland is used for compressing the spring probes. A role of the conductive sheet is to transmit an electrical signal and make a contact with the spring probe and the pressure sensor. The pressure sensor can feed back the pressure applied to the spring probe in real time, and the pressure sensor is made of a metal material. The pressure spring is in contact with the conductive sheet, and serves to compress the conductive sheet and make it in a good contact with the pressure sensor and the spring probe, so as to conduct the electrical signal. The spring probe is placed on an inner side of the single probe frame; and the inner side of the single probe frame has an external thread structure threadedly connected with the internal thread structure of the internal threaded hole, to control the relative height position of the spring probe.

Preferably, the spring probe includes a probe shaft, a probe sleeve, a probe spring, and a probe top end cover, all of which are coaxially arranged; the probe sleeve includes a sleeve cavity and a sleeve position-limiting portion; the sleeve position-limiting portion is arranged at the bottom end of the sleeve cavity; the probe spring is sleeved in the sleeve cavity; the probe shaft includes a probe shaft body, a probe shaft clamping portion, and a probe shaft end portion; the probe shaft clamping portion is arranged at an upper part of the probe shaft body; the upper part of the probe shaft body is sleeved in the sleeve cavity, and the probe shaft clamping portion is clamped above the sleeve position-limiting portion; the probe shaft end portion is arranged at the bottom end of the probe shaft body, and makes a contact with the conductive fiber material sample; the probe top end cover is arranged at the top end of the sleeve cavity; one end of the probe spring is abutted against the probe top end cover, and the other end of the probe spring is abutted against the top end plane of the probe shaft. Preferably, the probe top end cover of the spring probe includes a cover top end, a cover clamping portion, and a cover connection portion; the pressure sensor and the conductive sheet are both sleeved on the cover top end; the cover connection portion is clamped and secured to the top end of the sleeve cavity; and the cover clamping portion is clamped on the top of the single probe frame, and has an external diameter identical to that of the single probe frame. The spring probe is placed in the single probe frame; and external threads of the single probe frame may be threadedly connected with internal threads of the internal threaded hole. Relying on threaded rotation, the single probe frame can ascend and descend; and meanwhile, the spring probe can ascend and descend along with the single probe frame relying on the pressure of the pressure spring at the upper end. The pressure of each spring probe is adjusted by the cooperation of the spring probe and the single probe frame; and the single probe frame can be moved up and down, by which the compression degree of the spring probe can be controlled, thereby achieving an adjustment of pressure within a large range.

Preferably, the single probe frame has an internal diameter identical to an external diameter of the probe sleeve. Due to the cooperation of the single probe frame and the internal threaded hole, if it is desired to change into another size of the spring probe depending on the sample, it only needs to change the internal diameter of the single probe frame to adapt to the external diameter of the probe sleeve of the spring probe, thereby achieving finer replacement of the spring probe, which is a very important requirement for testing different samples.

Preferably, a through hole is formed between the bottom of the internal threaded hole and the bottom of the probe frame main body; and the probe shaft at the bottom of the spring probe is exposed from the through hole, and makes a contact with the conductive fiber material sample.

Preferably, the gland main body is provided with a gland bolt hole; the probe frame main body is provided with a probe frame bolt hole which corresponds to the gland bolt hole; and the gland bolt hole is in compressed connection with the probe frame bolt hole through a bolt.

In the present application, an ohmic contact test is introduced before initiating the test of resistivity of the conductive fiber material. The method of the ohmic contact test specifically comprises: before starting a normal test by the probe module, all the probe pressures are controlled to be the same, and two probes at both ends and two probes in the middle are selected for forward and reverse step current conductions respectively, with their voltage values being measured. The step current refers to that forward and reverse currents are increased or decreased in turn to form multi-point fitting. When the test data is subjected to I-V linearly fitting by a computer to provide a linear fitting degree, if the linear fitting degree is more than 95%, it can be considered as presence of the ohmic contact, and the test of resistivity can be started.

The present invention has the following beneficial effects:

According to the above technical solutions, by the threaded fit of the internal threaded hole and the single probe frame, the present invention has changed the existing situation that it is difficult to change the size of the probe according to the sample requirements due to the direct cooperation of the probe and the probe frame; and the pressure of the spring probe can be adjusted within a large range, and can be fed back in real time. The size of the spring probe can be changed according to the sample requirements such as size and roughness parameters, so that only the probe needs to be replaced without replacing the probe frame main body. Different types of spring probes, after being subjected to a simple design, can be adapted to the single probe frame, which reduces the possibility of affecting the stability of the measurement results of a measurement apparatus due to the use of different methods. Adopting a uniform standard greatly improves elimination of the interference of irrelevant factors to the measurement result. The probe module is of a simple structure, and is more convenient to operate and more concise in process when in use. Moreover, when performing a test, it not only requires that the pressures of the four spring probes are consistent with each other in the test process, but it is also necessary to introduce an ohmic contact test when the conductive fiber material coated with a semiconductor or graphene material is tested. Such ohmic contact test is a decisive factor to determine whether the semiconductor material can be tested.

The above description is only an overview of the technical solutions of the present invention. In order to make one understand the technical means of the present invention more clearly and implement the same according to the disclosure of the specification, and also in order to make the above and other purposes, the technical features and the advantages of the present invention more easy to understand, one or more preferred embodiments are exemplified below, and detailed description is made as follows with reference to the accompanying drawings.

BRIEF DESCRIPTION OF THE DRAWINGS

One or more embodiments are exemplarily illustrated with reference to figures in the corresponding accompanying drawings. These exemplary illustrations do not constitute a limitation on the embodiments, and the elements with the same reference numeral in the accompanying drawings are indicated to be similar elements. Unless it is specifically stated, the figures in the accompanying drawings do not constitute any proportional limitations.

MAIN REFERENCE NUMERALS

Figure 1:
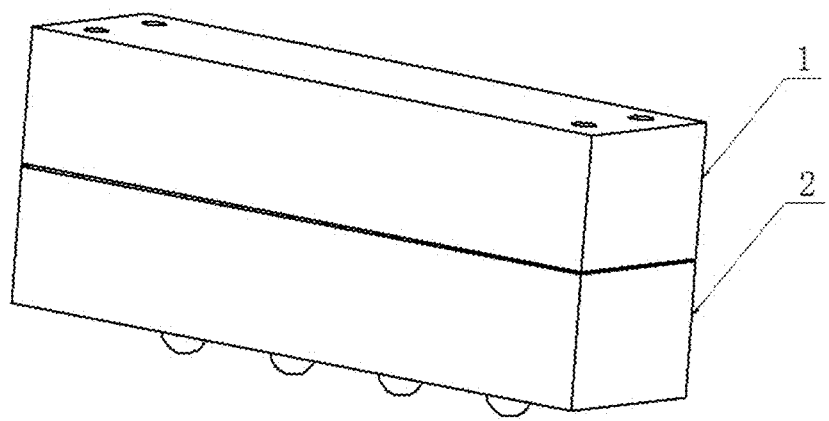
FIG. 1 is an overall structural schematic diagram of a probe module for testing the resistivity of a conductive fiber material according to the present invention.
Figure 2:
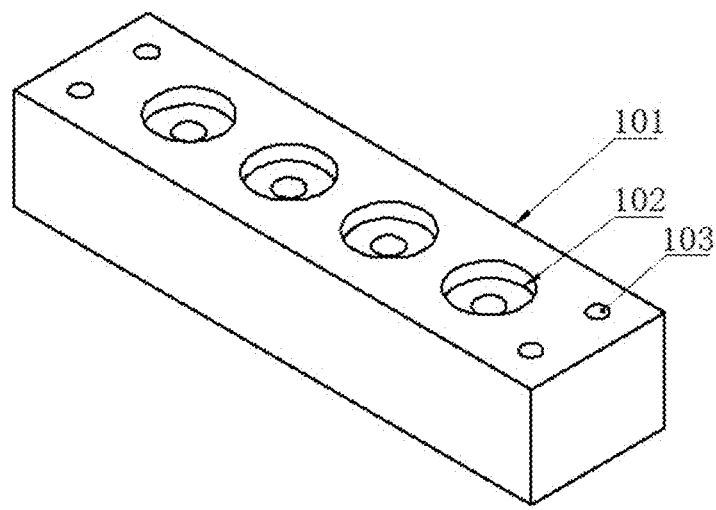
FIG. 2 is a structural schematic diagram of an upper end gland of a probe module for testing the resistivity of a conductive fiber material according to the present invention.
Figure 3:
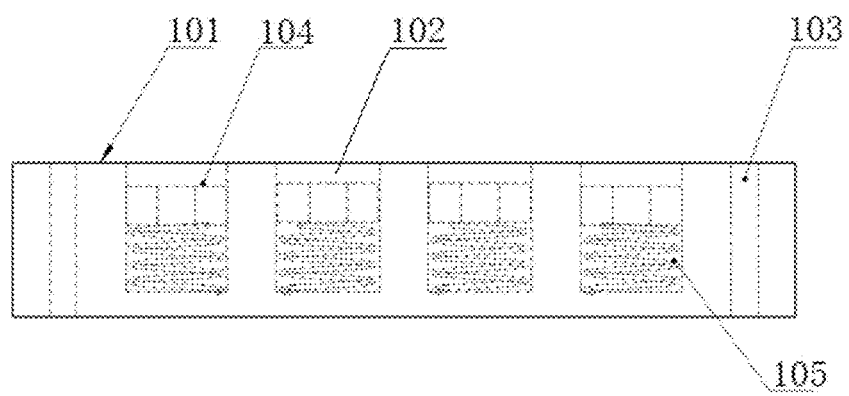
FIG. 3 is a cross-sectional schematic diagram of an upper end gland of a probe module for testing the resistivity of a conductive fiber material according to the present invention.
Figure 4:
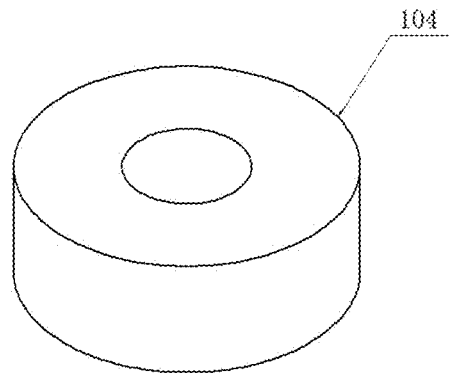
FIG. 4 is a structural schematic diagram of a conductive sheet of a probe module for testing the resistivity of a conductive fiber material according to the present invention.
Figure 5:
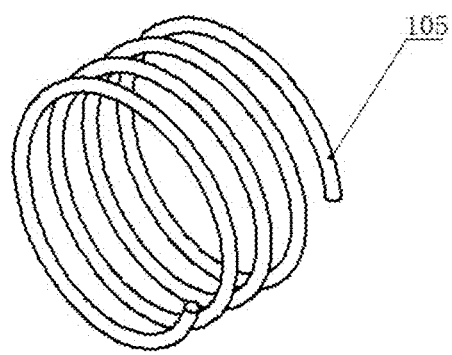
FIG. 5 is a structural schematic diagram of a pressure spring of a probe module for testing the resistivity of a conductive fiber material according to the present invention.
Figure 6:
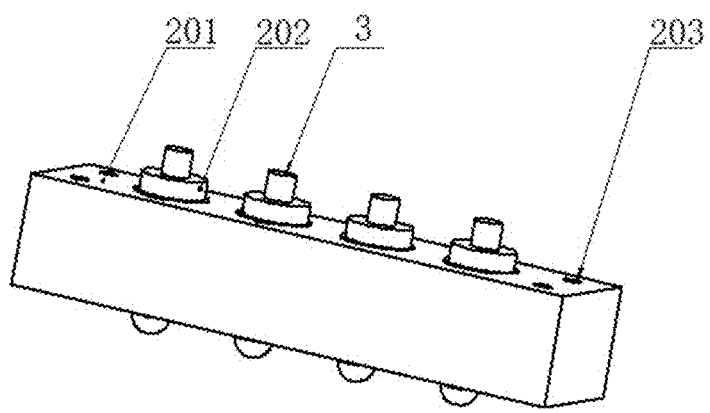
FIG. 6 is a structural schematic diagram of a probe frame module of a probe module for testing the resistivity of a conductive fiber material according to the present invention.
Figure 7:
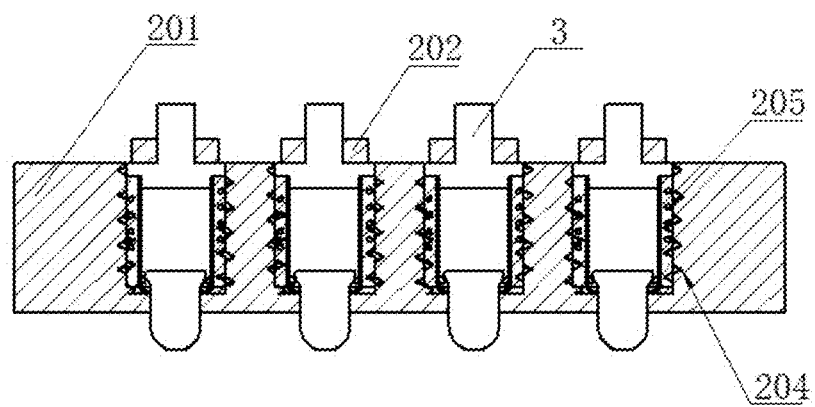
FIG. 7 is a cross-sectional schematic diagram of a probe frame module of a probe module for testing the resistivity of a conductive fiber material according to the present invention.
Figure 8:
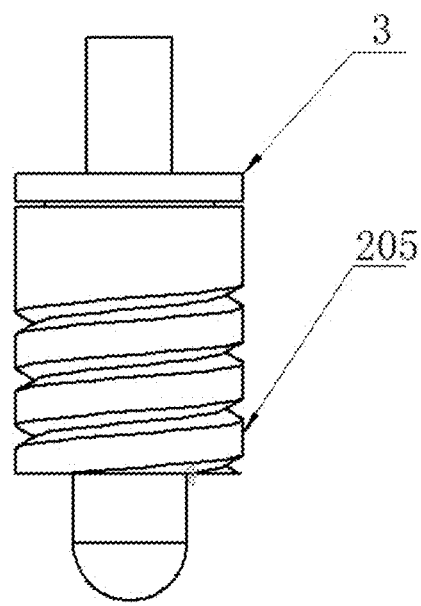
FIG. 8 is a structural schematic diagram of a spring probe and a single probe frame of a probe module for testing the resistivity of a conductive fiber material according to the present invention.
Figure 9:
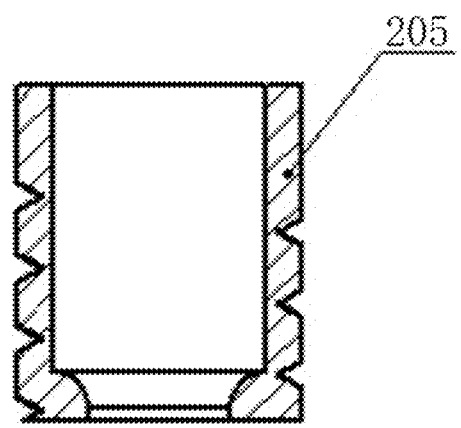
FIG. 9 is a cross-sectional schematic diagram of a single probe frame of a probe module for testing the resistivity of a conductive fiber material according to the present invention.

1—upper end gland, 101—gland main body, 102—gland spring hole, 103—gland bolt hole, 104—conductive sheet, 105—pressure spring, 2—probe frame module, 201—probe frame main body, 202—pressure sensor, 203—probe frame bolt hole, 204—internal threaded hole, 205—single probe frame, 3—spring probe, 301—probe top end cover, 302—probe spring, 303—probe sleeve, and 304—probe shaft.

DETAILED DESCRIPTION OF THE INVENTION

The implementations of the present invention will be described below in detail with reference to the accompanying drawings, but it should be understood that the scope of protection of the present invention is not limited by the implementations.

Unless otherwise expressly stated, the term "includes" or its transformations such as "contains" or "comprises" will be understood to include the stated elements or components throughout the specification and the claims, without excluding other elements or other components.

Herein, for convenience of description, spatial relative terms such as "under", "below", "underneath", "on", "above", "over", etc., can be used to describe the relationship between one element or feature and another element or feature in the accompanying drawings. It should be understood that the spatial relative terms are intended to include different directions of an object in use or operation in addition to the directions depicted in the drawings. For example, if an object in the drawing is flipped, the element described as being "below" or "underneath" another element or feature will be oriented "above" the element or feature. Therefore, the exemplary term "below" can include two directions: below and above. Objects can also have other orientations (rotation 90 degrees or other orientations), and the spatial relative terms used herein should be explained correspondingly.

As shown in FIGS. 1-10, a probe module for testing the resistivity of a conductive fiber material includes an upper end gland 1, a probe frame module 2, and a spring probe 3, where the upper end gland 1 is in compressed connection with the probe frame module 2 through a bolt; the gland main body 101 is provided with a gland bolt hole 103; the probe frame main body 201 is provided with a probe frame bolt hole 203 which corresponds to the gland bolt hole 103; and the gland bolt hole 103 is in compressed connection with the probe frame bolt hole 203 through a bolt.

The upper end gland 1 includes a gland main body 101, four gland spring holes 102, a conductive sheet 104, and a pressure spring 105, where the four gland spring holes 102 are uniformly formed in the bottom surface of the gland main body 101, one end of the pressure spring 105 is abutted against the top of the gland spring holes 102, and the other end of the pressure spring 105 is in contact with the conductive sheet 104.

The probe frame module 2 includes a probe frame main body 201, a pressure sensor 202, four internal threaded holes 204, and a single probe frame (205), where the four internal threaded holes (204) are uniformly formed in the top surface of the probe frame main body 201; an inner wall of each of the internal threaded holes 204 is of an internal thread structure; an outer wall of the single probe frame 205 is of an external thread structure which is matched with the internal thread structure and threadably secured thereto; the single probe frame 205 is internally provided with a spring probe 3; the pressure sensor 202 is in contact with the conductive sheet 104, and both of them are sleeved on an upper part of the spring probe 3; the top end of the spring probe 3 is in contact with the pressure spring 105; and the bottom end of the spring probe 3 is in contact with a conductive fiber material sample to be tested.

A method for testing the resistivity by a collinear four-probe array comprises, making four conductive probes in the collinear four-probe array in a good contact with the sample, and then measuring the resistivity by applying a current and a probing voltage to two of the conductive probes. Therefore, four spring probes 3 are placed in the probe frame module 2, and the upper end gland 1 is used for compressing the spring probes 3. A role of the conductive sheet 104 is to transmit an electrical signal and make a contact with the spring probe 3 and the pressure sensor 202. The pressure sensor 202 can feed back the pressure applied to the spring probe 3 in real time, and the pressure sensor 202 is made of a metal material. The pressure spring 105 is in contact with the conductive sheet 104, and serves to compress the conductive sheet 104 and make it in a good contact with the pressure sensor 202 and the spring probe 3, so as to conduct the electrical signal. The spring probe 3 is placed on an inner side of the single probe frame 205; and the inner side of the single probe frame 205 has an external thread structure threadedly connected with the internal thread structure of the internal threaded hole 204, to control the relative height position of the spring probe 3.

Figure 10:
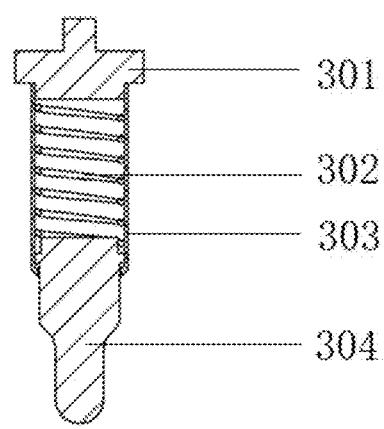
FIG. 10 is a structural schematic diagram of a spring probe of a probe module for testing the resistivity of a conductive fiber material according to the present invention.

As shown in FIG. 10, the spring probe 3 includes a probe shaft 304, a probe sleeve 303, a probe spring 302, and a probe top end cover 301, all of which are coaxially arranged; the probe sleeve 303 includes a sleeve cavity and a sleeve position-limiting portion; the sleeve position-limiting portion is arranged at the bottom end of the sleeve cavity; the probe spring 302 is sleeved in the sleeve cavity; the probe shaft 304 includes a probe shaft body, a probe shaft clamping portion, and a probe shaft end portion; the probe shaft clamping portion is arranged at an upper part of the probe shaft body; the upper part of the probe shaft body is sleeved in the sleeve cavity, and the probe shaft clamping portion is clamped above the sleeve position-limiting portion; the probe shaft end portion is arranged at the bottom end of the probe shaft body, and makes a contact with the conductive fiber material sample; the probe top end cover 301 is arranged at the top end of the sleeve cavity; one end of the probe spring 302 is abutted against the probe top end cover 301, and the other end of the probe spring 302 is abutted against the top end plane of the probe shaft 304.

The probe top end cover 301 of the spring probe 3 includes a cover top end, a cover clamping portion, and a cover connection portion; the pressure sensor 202 and the conductive sheet 104 are both sleeved on the cover top end; the cover connection portion is clamped and secured to the top end of the sleeve cavity; and the cover clamping portion is clamped on the top of the single probe frame 205, and has an external diameter identical to that of the single probe frame 205. The spring probe 3 is placed in the single probe frame 205; and external threads of the single probe frame 205 may be threadedly connected with internal threads of the internal threaded hole 204. Relying on threaded rotation, the single probe frame 205 can ascend and descend; and meanwhile, the spring probe 3 can ascend and descend along with the single probe frame 205 relying on the pressure of the pressure spring 105 at the upper end. The pressure of each spring probe 3 is adjusted by the cooperation of the spring probe 3 and the single probe frame 205; and the single probe frame 205 can be moved up and down, by which the compression degree of the spring probe 3 can be controlled, thereby achieving an adjustment of pressure within a large range.

The single probe frame 205 has an internal diameter identical to an external diameter of the probe sleeve 303. Due to the cooperation of the single probe frame 205 and the internal threaded hole 104, if it is desired to change into another size of the spring probe 3 depending on the sample, it only needs to change the internal diameter of the single probe frame 205 to adapt to the external diameter of the probe sleeve 303 of the spring probe 3, thereby achieving finer replacement of the spring probe 3, which is a very important requirement for testing different samples.

A through hole is formed between the bottom of the internal threaded hole 204 and the bottom of the probe frame main body 201; and the probe shaft 304 at the bottom of the spring probe 3 is exposed from the through hole, and makes a contact with the conductive fiber material sample.

In the present application, an ohmic contact test is introduced before initiating the test of resistivity of the conductive fiber material. The method of the ohmic contact test specifically comprises: before starting a normal test by the probe module, all the probe pressures are controlled to be the same, and two probes at both ends and two probes in the middle are selected for forward and reverse step current conductions respectively, with their voltage values being measured. The step current refers to that forward and reverse currents are increased or decreased in turn to form a multipoint fitness. When the test data is subjected to I-V linearly fitting by a computer to provide a linear fitting degree, if the linear fitting degree is more than 95%, it can be considered as presence of the ohmic contact, and the test of resistivity can be started.

The invention claimed is:

1. A probe module for testing the resistivity of a conductive fiber material, comprising an upper end gland, a probe frame module, and a spring probe, wherein the upper end gland is in compressed connection with the probe frame module through a bolt;

the upper end gland comprises a gland main body, four gland spring holes, a conductive sheet, and a pressure spring, wherein the four gland spring holes are uniformly formed in the bottom surface of the gland main body, one end of the pressure spring is abutted against the top of the gland spring hole, and the other end of the pressure spring is in contact with the conductive sheet;

the probe frame module comprises a probe frame main body, a pressure sensor, four internal threaded holes, and a single probe frame, wherein the four internal threaded holes are uniformly formed in the top surface of the probe frame main body;

an inner wall of each of the internal threaded holes is of an internal thread structure; an outer wall of the single probe frame is of an external thread structure which is matched with the internal thread structure and threadably secured thereto; the single probe frame is internally provided with a spring probe; the pressure sensor is in contact with the conductive sheet, and both of them are sleeved on an upper part of the spring probe;

the top end of the spring probe is in contact with the pressure spring; and the bottom end of the spring probe is in contact with a conductive fiber material sample to be tested.

2. The probe module for testing the resistivity of a conductive fiber material according to claim 1, wherein the spring probe comprises a probe shaft, a probe sleeve, a probe spring, and a probe top end cover, all of which are coaxially arranged; the probe sleeve comprises a sleeve cavity and a sleeve position-limiting portion; the sleeve position-limiting portion is arranged at the bottom end of the sleeve cavity; the probe spring is sleeved in the sleeve cavity; the probe shaft comprises a probe shaft body, a probe shaft clamping portion, and a probe shaft end portion; the probe shaft clamping portion is arranged at an upper part of the probe shaft body; the upper part of the probe shaft body is sleeved in the sleeve cavity, and the probe shaft clamping portion is clamped above the sleeve position-limiting portion; the probe shaft end portion is arranged at the bottom end of the probe shaft body, and makes a contact with the conductive fiber material sample; the probe top end cover is arranged at the top end of the sleeve cavity; one end of the probe spring is abutted against the probe top end cover, and the other end of the probe spring is abutted against the top end plane of the probe shaft.

3. The probe module for testing the resistivity of a conductive fiber material according to claim 2, wherein the probe top end cover of the spring probe comprises a cover top end, a cover clamping portion, and a cover connection portion; the pressure sensor and the conductive sheet are both sleeved on the cover top end; the cover connection portion is clamped and secured to the top end of the sleeve cavity; and the cover clamping portion is clamped on the top of the single probe frame, and has an external diameter identical to that of the single probe frame.

4. The probe module for testing the resistivity of a conductive fiber material according to claim 3, wherein the single probe frame has an internal diameter identical to an external diameter of the probe sleeve.

5. The probe module for testing the resistivity of a conductive fiber material according to claim 4, wherein a through hole is formed between the bottom of the internal threaded hole and the bottom of the probe frame main body; and the probe shaft at the bottom of the spring probe is exposed from the through hole, and makes a contact with the conductive fiber material sample.

6. The probe module for testing the resistivity of a conductive fiber material according to claim 1, wherein the gland main body is provided with a gland bolt hole; the probe frame main body is provided with a probe frame bolt hole which corresponds to the gland bolt hole; and the gland bolt hole is in compressed connection with the probe frame bolt hole through a bolt.

* * * * *